United States Patent [19]

Everts

[11] Patent Number: 5,003,662
[45] Date of Patent: Apr. 2, 1991

[54] CONNECTOR FOR A CONVERTIBLE BLOWER-VACUUM

[75] Inventor: Robert G. Everts, Chandler, Ariz.
[73] Assignee: Inertia Dynamics Corporation, Chandler, Ariz.
[21] Appl. No.: 451,729
[22] Filed: Dec. 15, 1989
[51] Int. Cl.$^5$ ............................................. A47L 9/02
[52] U.S. Cl. ....................................... 15/330; 15/405; 15/414; 285/7; 285/376; 285/921
[58] Field of Search ................ 15/330, 405, 414; 285/7, 304, 314, 376, 921

[56] References Cited

U.S. PATENT DOCUMENTS

| | | | |
|---|---|---|---|
| 2,468,849 | 5/1949 | Trainor | 285/314 |
| 3,219,364 | 11/1965 | Woddridge | 285/376 X |
| 3,250,551 | 5/1966 | Draudt | 285/7 |
| 3,797,764 | 3/1974 | Guth | 285/314 X |
| 4,325,163 | 4/1982 | Mattson et al. | 15/405 X |
| 4,674,146 | 6/1987 | Tuggle et al. | 15/405 X |
| 4,694,528 | 9/1987 | Comer et al. | 15/405 X |

FOREIGN PATENT DOCUMENTS 5272 11/1882 United Kingdom ................ 285/314

Primary Examiner—Chris K. Moore
Attorney, Agent, or Firm—Brooks & Kushman

[57] ABSTRACT

A connector is provided for releaseably fastening a vacuum pipe to the body of an implement which is convertible between a blower and vacuum mode. The vacuum pipe is adapted to attach to an intake port formed in the body of the implement. The vacuum pipe is provided with a collar having a series of angularly spaced apart receptacles each having a passage therethrough provided with a locking surface extending part way along the passage and an abutment aligned with the locking surface defining a space therebetween. The body is provided with a plurality of stakes angularly spaced about the intake port aligned with the passages on the collar. Each stake is provided with a locking face disposed and arranged to overhang the locking surface in the collar and has a thickness substantially equal to the spacing between the locking surface and abutment. The collar is adapted to be angularly positioned relative to the body with the passages aligned with the stakes. The collar can then be turned to move the stakes into the spacing thereby holding the stakes with the locking faces overhanging the locking surfaces on the collar to provide a secure connection between the vacuum pipe and implement intake port. Preferably, the intake port includes a sleeve-like extension to telescopically fit within the vacuum pipe and the groove extending about the sleeve to receive and stabilize an end the vacuum pipe.

6 Claims, 2 Drawing Sheets

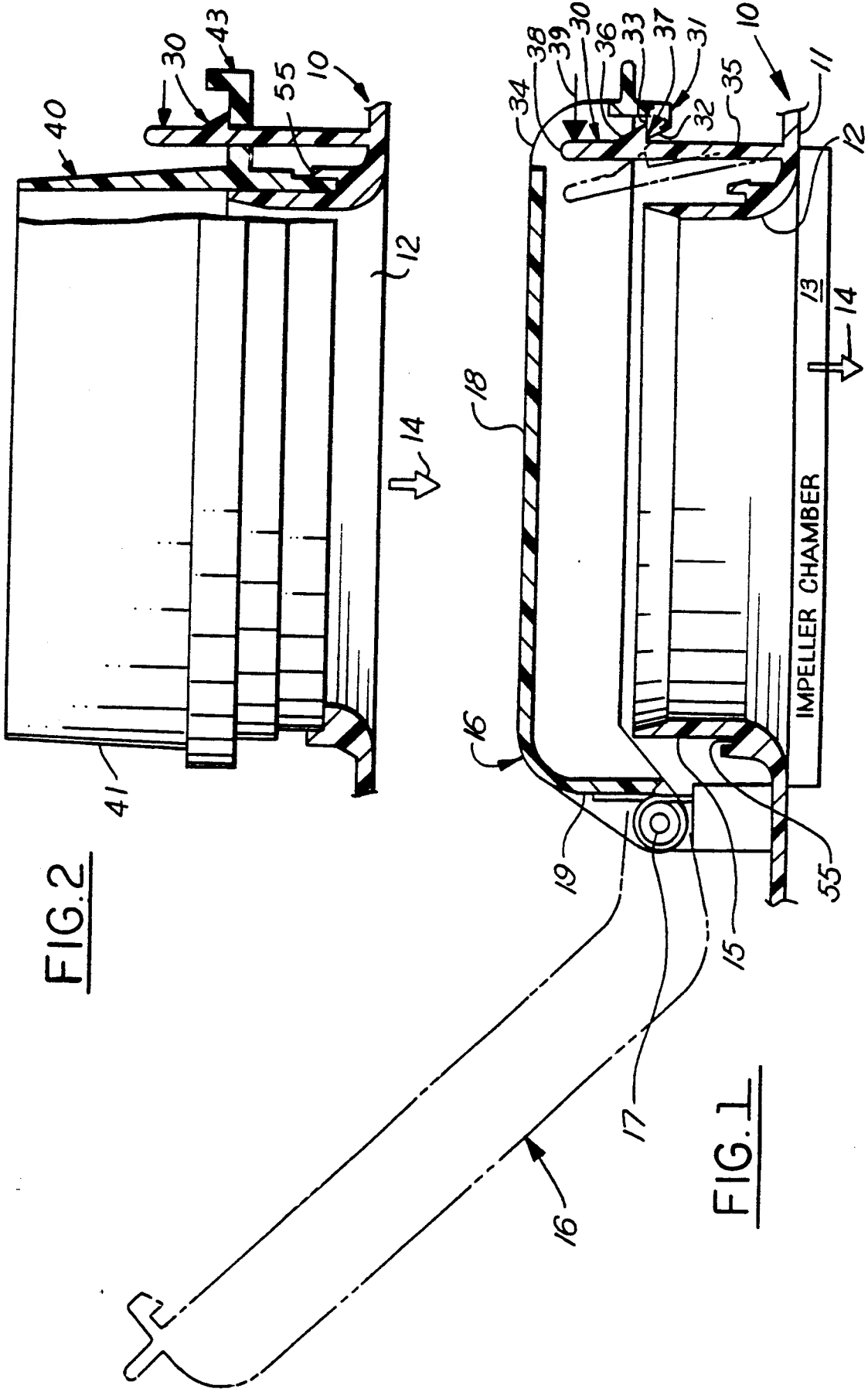

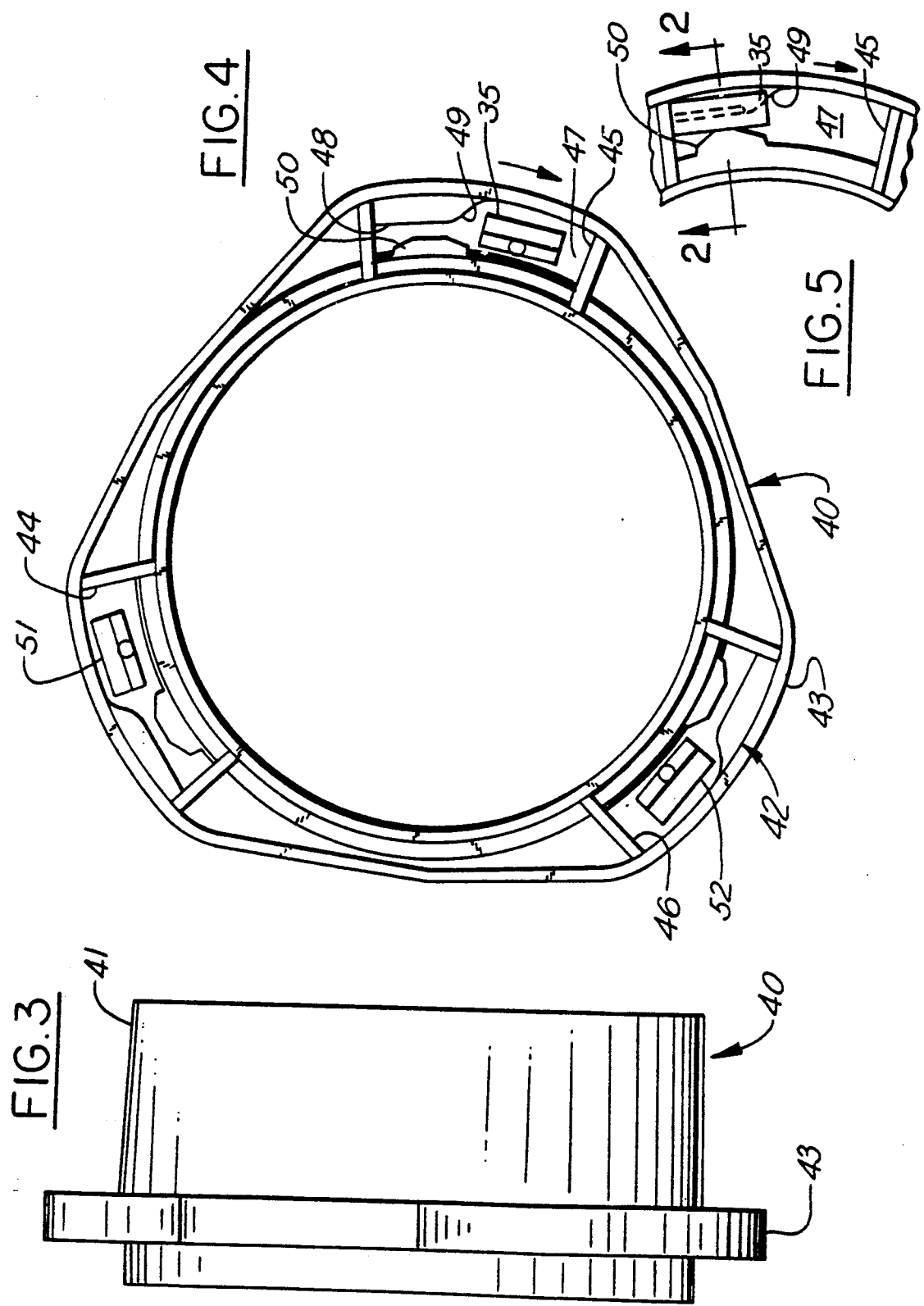

CONNECTOR FOR A CONVERTIBLE BLOWER-VACUUM

FIELD OF THE INVENTION

This invention relates to a convertible vacuum-blower, and in particular to a reliable releasable connector for holding a vacuum pipe to the body of the implement.

BACKGROUND OF THE INVENTION

Hand held implements which are capable of selectively functioning as a vacuum or as a blower are popularly used by gardeners and by outdoor maintenance personnel. They customarily include a fractional horsepower 2 cycle gasoline engine which turns an impeller in an impeller chamber. The chamber has an intake port and an outlet port. The impeller generates an air stream that flows from the inlet port to the outlet port that can selectibly be used for blowing or for vacuuming purposes.

At the outlet port, a blower pipe can be connected to the body of the implement to direct the generated air stream to blow leaves and debris in the blower mode. For the vacuum mode, a collection bag can be attached to the body at the outlet port to receive detritus which is ingested through a vacuum pipe into the intake port and thence through the impeller chamber to the collection bag.

In the blower mode, the intake port to the impeller is suitably shrouded to protect the operator from contact with the impeller, but is adapted to permit air to enter the impeller chamber. In the vacuum mode a large diameter, elongated vacuum pipe is connected to the intake port instead. The free end of the vacuum pipe is moved along the ground to pick up detritus in the air stream which enters it, and flows through the impeller chamber, out the outlet port, and into the collection bag. The flow direction of the air stream is the same in both the blower mode and in the vacuum mode, but for each mode, different devices such as the vacuum pipe, the blower pipe, or the collection bag, are connected to the appropriate port, and they must resist the physical contacts to which they are subject.

One such arrangement is shown in Tuggle U.S. Pat. No. 4,674,146, issued Jun. 23, 1987, which patent is incorporated herein by reference for its showing of a hand held convertible vacuum/blower for these purposes. In the Tuggle device the connection of the vacuum pipe to the body of the implement is made by means of a collar which surrounds the intake port. A clamp surrounds the collar and compresses the collar against the pipe to hold it in place. A vacuum/blower with this arrangement has in fact enjoyed wide sales acceptance. However, the applicant has found that a peripheral compressive clamp is more subject to unintentional disengagement than it should be. While no harm is done if the vacuum pipe falls off in use, it is certainly an inconvenience to have to stop the implement and reassemble it. Users object to this inconvenience.

It is an object of this invention to overcome the disadvantages of the peripheral clamp joinder. In so doing it has been kept in mind that his implement must fit into an economic niche where cost and complexity of the device must be minimized.

Accordingly it is another object of this invention to provide a connector means which is expedient and economical, as well as more reliable. In fact, this connector is readily manufactured as a two-piece device in which each part is respective to either the body or the pipe, and there is no independent part to account for or to be lost or disengaged. While they are engaged they are not liable unintentionally to be separated from one another.

BRIEF DESCRIPTION OF THE INVENTION

This invention is carried out with a convertible vacuum-blower which has a frame supporting a motive means such as a fractional horsepower gasoline engine, and an impeller driven by it. It includes a body that forms an impeller chamber housing that houses the impeller. An intake port, and an outlet port, are formed on opposite sides of the impeller through which the airstream passes. Each port has a surrounding face to which a pipe or collector bag is to be fitted.

According to the preferred embodiment of the invention, a rotary type bayonet connector has two parts, one of which parts is attached to the body at the inlet port, and the other of which parts is attached to the vacuum pipe. These parts are adapted to be joined to each other, so as to exert an axial restraint on the pipe and hold it firmly against the body when in one rotary position, and to release it when in another rotary position.

The above and other features of this invention will be fully understood from the following detailed description and the accompanying drawings, in which:

BRIEF DESCRIPTION OF THE DRAWINGS

FIG. 1 is an axial cross-section of a portion of the body of the implement and of its outlet port;

FIG. 2 is a side view, partly in axial cutaway cross-section, showing the implement of FIG. 1 in the condition used for the blower mode;

FIG. 3 is a side view of a vacuum pipe for use in the vacuum mode;

FIG. 4 is a top view of FIG. 2 with the vacuum pipe placed for the vacuum mode, but not yet fixed; and FIG. 5 is a fragmentary view of FIG. 4 with the vacuum pipe rotated to its fixed condition in the vacuum mode.

DETAILED DESCRIPTION OF THE INVENTION

The parts of a convertible vacuum-blower 10 which are pertinent to this invention are shown in the drawings. The implement has a body 11 which forms an intake port 12 that leads to an impeller chamber 13. A power-driven impeller (not shown) is housed in the impeller chamber. It always rotates in the same direction so as to draw an airstream into the intake port and impell it out an outlet port (not shown). The direction of the airstream is shown by arrow 14.

When the implement is to be used as a blower, a blower pipe (not shown) is attached to the body at the outlet port. When it is to be used as a vacuum, a collector bag is instead attached to the body at the outlet port. The arrangement at the outlet port is of no importance to this invention.

A tubular neck 15 is formed around the intake port. A lid 16 is hingedly mounted to the body at hinge 17, and is spring-loaded to the position shown in solid line in FIG. 1. This is the position it occupies when the implement is used in the blower mode.

The lid has an imperforate top 18 and a surrounding skirt 19. The objective is to leave a peripheral airflow path from the atmosphere into the intake port, even when the lid overlays the intake port.

When the vacuum pipe 40 is installed as in FIG. 2, to provide a vacuum intake, the lid will be pivoted away from the intake port, and when the implement is in use as a vacuum it will bear against the side of the vacuum pipe, out of the way. The airstream will then be from the free end of the vacuum pipe, through the intake port, into, through, and out of the impeller chamber, out the outlet port, and into the porous collection bag.

The object of this invention is to provide a simple and expedient means to connect the vacuum pipe to the body, and to disconnect it from the body.

Because the lid is a safety item intended to keep the user's hand and excessively large foreign objects out of the impeller chamber, the lid is provided with a latch 30. The latch includes an inwardly facing lip 31 with a deflector surface 32 and a lock surface 33. An access hole 34 is formed in the lid to give access to the top of a stake 35 when the lid is closed.

Stake 35 is preferably formed integrally with the body. It is stiffly springily flexible. It has a deflector surface 36 to engage and pass over deflector surface 32, and a lock surface 37 to engage lock surface 33 in the lid-closed condition. For convenience, a post 38 may be provided to enable the upper end of the stake to be pressed inwardly to enable the latch to be released. Arrow 39 shows the force to be exerted to free the stake from the lid so the lid can be tipped away from the intake port and a vacuum pipe can be attached to convert the implement to a vacuum.

Vacuum pipe 40 is shown in FIGS. 2, 3 and 4. It has a tubular portion 41 of any desired length. If preferred, the length may be just long enough to make a tight friction fit with another section of vacuum pipe which will take the physical wear.

The vacuum pipe is coupled to the body by a twist type connector 42. This connector is joined and released by rotating the pipe. It includes a collar 43 having a plurality of receptacles 44, 45, 46 evenly spaced around the pipe. The receptacles are all identical, so that only receptacle 45 will be described. Receptacle 45 has a passage 47 which when aligned with stake 35 (the same stake which is used for the lid latch) will freely pass the stake. To one side of the passage there is a locking shoulder 48, and a guide edge 49. Aligned with the shoulder is an abutment 50. Abutment 50 is spaced from the locking shoulder by a distance a bit greater than the thickness of the stake.

While a post is provided on stake 35 to assist in unlatching the lid, it is optional on the other stakes 51, 52. Stake 35 must have sufficient flexibility to allow it to be moved to unlatch the lid as shown in FIG. 1. Stakes 51 and 52 may be rigid, but it will generally be better practice to make them the same as stake 35 to facilitate manufacturing this product by molding.

A peripheral groove 55 surrounding the intake port shoulder receives and stabilizes one end of the vacuum pipe.

The coupling and uncoupling of the vacuum pipe will be evident from FIGS. 4 and 5. FIG. 4 shows the collar in its uncoupled position, in which the vacuum pipe can be removed by an axial pull. It is also the initial position for coupling. The head of the stake has passed through the passage, and its lock surface is at a level at least as high as the locking shoulder.

The vacuum pipe is next twisted to the position shown in FIG. 5. The locking shoulder will have moved under the lock surface, and the stake will be pressed against the shoulder by the abutment. It is trapped so it cannot move off of the locking shoulder until the vacuum pipe is again turned to the position shown in FIG. 4.

This is a strong connection not liable to be separated by impact loads. It is readily manufactured by molding processes, and is attractive to the eye. It requires no gripping forces such as clamping forces, only a twist of the relatively large vacuum pipe.

This invention is not to limited by the embodiment shown in the drawings and described in the description, which is given by way of example and not of limitation, but only in accordance with the scope of the appended claims.

I claim:

1. A connector for releasably connecting a vacuum pipe to the body of an implement convertible to a blower mode or to a vacuum mode, said body having an impeller chamber, and an intake port to the impeller chamber, said connector comprising:

a collar around said vacuum pipe, said collar having a plurality of receptacles which include passages therethrough, said receptacles being angularly spaced apart, a locking surface in each said passage, extending only partway along said passage, and an abutment aligned with said locking surface leaving a spacing between them; and a plurality of stakes on said body each aligned with a respective passage, each stake having a locking face so disposed and arranged as to overhang said locking surface when aligned therewith, and a dimension of thickness substantially equal to said spacing, whereby with the collar angularly positioned with the passages alinged with the stakes and with the stakes to one side of the abutment and locking surfaces, the collar can be pressed against the body with the locking faces at a level above the locking surfaces, and the collar can then be turned to move the stakes into said spacing, thereby holding the stakes with their locking faces overhanging said locking surface to hold the vacuum pipe connected to the body.

2. Apparatus according to claim 1 in which a groove extends around said intake port to receive and to stabilize and end of the vacuum pipe.

3. Apparatus according to claim 1 in which the intake port has a sleeve-like extension to fit into an end of the vacuum pipe.

4. Apparatus according to claim 3 in which a groove extends around said intake port to receive and to stabilize and end of the vacuum pipe.

5. Apparatus according to claim 1 in which said vacuum pipe includes a tubular portion of sufficient length to provide friction fit with another section of pipe.

6. Apparatus according to claim 1 in which a hinged lid is mounted to said body to overlay said intake port when the vacuum pipe is removed, said lid including latch means engageable with one of said stakes to releasably hold the lid closed.

* * * * *